July 19, 1966 G. S. RAYNOR 3,261,199
ISOKINETIC SAMPLING APPARATUS
Filed Feb. 3, 1965 2 Sheets-Sheet 1

INVENTOR.
GILBERT S. RAYNOR
BY

United States Patent Office 3,261,199
Patented July 19, 1966

3,261,199
ISOKINETIC SAMPLING APPARATUS
Gilbert S. Raynor, Manorville, Long Island, N.Y., assignor to the United States of America as represented by the United States Atomic Energy Commission
Filed Feb. 3, 1965, Ser. No. 430,229
5 Claims. (Cl. 73—28)

The invention described herein was made in the course of, or under a contract with the U.S. Atomic Energy Commission.

The present invention relates to isokinetic sampling apparatus.

By the isokinetic sampling of gas is meant the taking of samples with minimum disturbance of the lines of flow so as to get a true and representative sample of the particulate suspended. That is, the kinetics of the gas to be sampled are not disturbed. When atmospheric air is sampled for the purpose of determining its particulate content, the problem of isokinetic sampling is compounded by the fact that the air velocity, wind, is constantly changing in direction and magnitude.

While attempts over the years have been made to sample atmospheric air without disturbing the lines of flow to get a true and representative sample, a great difficulty has been to match the speed of the air entering the sampling tube to that of the ambient condition.

The present invention makes it possible to sample atmospheric air and similar gas environments without disturbing the lines of flow so as to obtain a sample which is truer and more representative than heretofore has been possible. Briefly described, the invention consists in providing a novel system incorporating a flow valve of unique construction and use which regulates the flow into a sampling tube in a precise manner to obtain an exact match of the inlet velocity to that of the velocity of the air which is being sampled. This results in little or no disturbance of the lines of flow.

It is thus a first object of this invention to provide apparatus for the isokinetic sampling of atmospheric air.

It is another object of this invention to obtain representative samples of the particulate in flowing gas.

Another object of the invention is a proportioning valve for controlling the mixing of gases with effective precision and rapid adjustment.

Still another object is a valve for the precise control of the flow of a gas.

Figure 1:
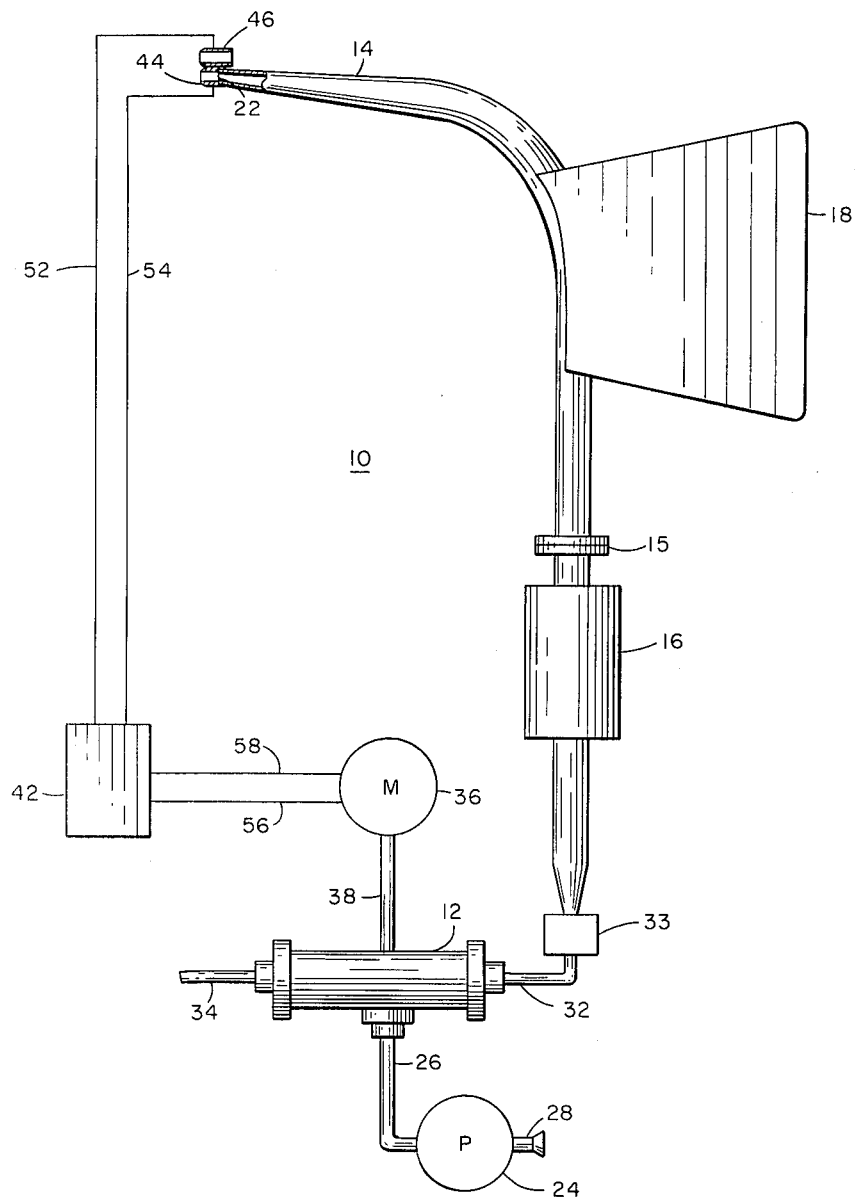
Figure 2:
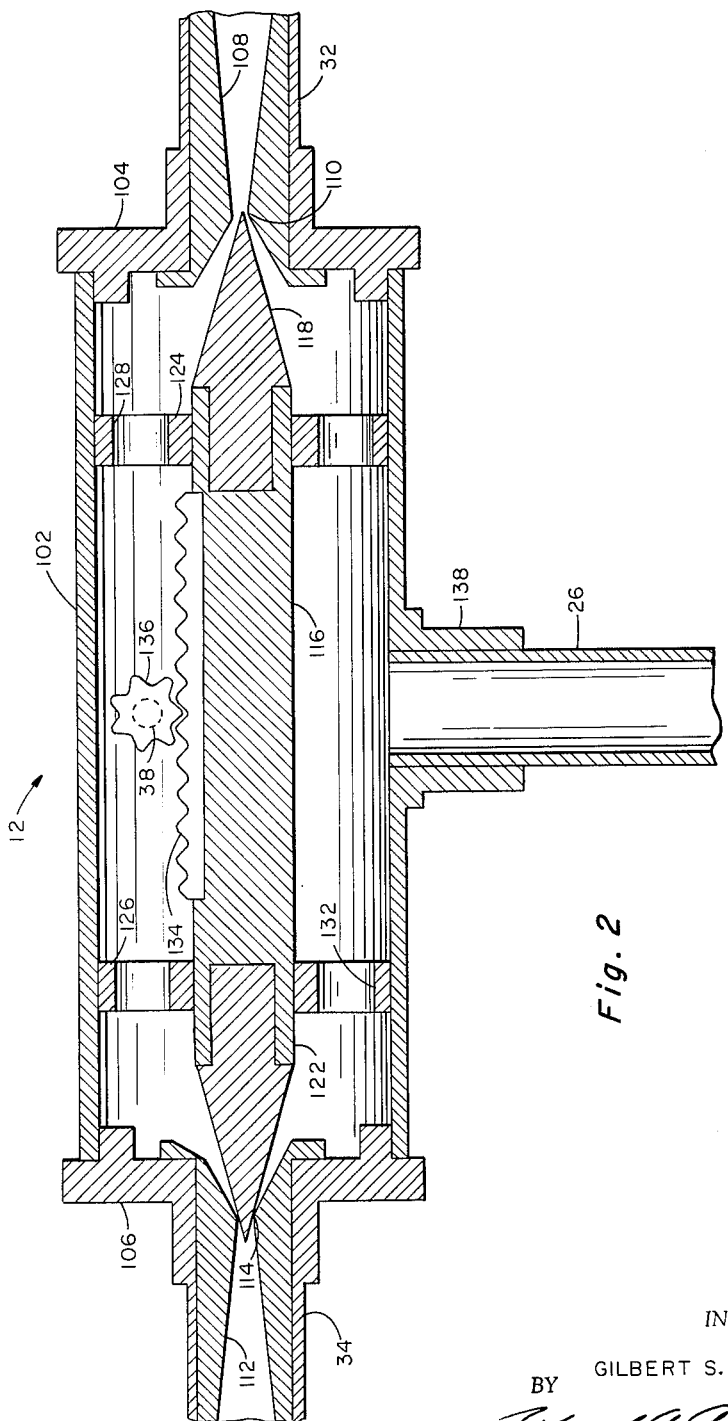

Other objects and advantages of this invention will become readily apparent from the following description of a preferred embodiment of the invention taken with the accompanying drawings in which:

FIG. 1 is a schematic illustration of apparatus embodying the principles of this invention, and FIG. 2 is a detail of a unique proportioning valve in accordance with this invention.

Referring to the drawings, there is illustrated in FIG. 1 an assembly 10 embodying a preferred configuration of this invention. Assembly 10 consists of the unique proportioning valve 12, to be more particularly described further below, air sampling device 14 which is swivelly mounted at joint 15, and a suitable filter 16 or other suitable particulate collection device. The air to be sampled enters sampling device 14 at opening 22 and enters a flared section which slows down the air and particles suspended therein to avoid at high velocities the impaction of particles on the walls of the bent portion of the sampling device, and also to avoid deposition on the floor of the tube at the lower air velocities. As is known in the art, sampling device 14 is free to rotate on bearings in joint 15 as directed by an attached vane tail 18 under the influence of the prevailing wind so that opening 22 is always faced into the wind. Filter 16 would be provided with the usual removable filter assembly to trap the particulate in the air which is being sampled.

The remaining elements of assembly 10 are a constant volume pump 24 with an inlet pipe 26 drawing from proportioning valve 12 and an outlet pipe 28 discharging to the atmosphere, an air inlet pipe 32 to proportioning valve 12 accepting the air from filter 16 through a recording flowmeter 33, an air inlet pipe 34 to accept ambient air into valve 12, an electric motor 36 connected by shaft 38 to adjust valve 12 as will be later described, and a servo control unit 42 of conventional design to perform a function as will be later described. Inlet pipe 34 would be provided with a filter for preventing dust and other particulate from entering valve 12.

Mounted on entrance 22 of air sampling device 14 are a pair of thermocouple holders 44 and 46, each having a hot wire anemometer (not shown) which senses the air speed therein as is understood in the art and passes this information through a pair of conductors 52 and 54 to servo unit 42. Holder 44 is lined up with entrance 22 so that air entering sampling device 14 must pass through it and hence servo unit 42 receives information on the velocity of the air entering device 14. Holder 46 is immediately adjacent holder 44 so that servo unit 42 also receives information on the velocity of the air in the immediately vicinity. As will be seen from the discussion further below, servo unit 42, by way of conductors 56 and 58 will control motor 36 and hence proportioning valve 12 so as to null the signals produced in holders 44 and 46, that is, to maintain the velocity of the air entering device 14 at exactly the local ambient condition. Pump 24 is maintained during use of apparatus at a constant operational rate.

Proportioning valve 12 is designed to supply the exact amount of air to pump 24 from sampling device 14 to null the above described velocity signals. For a detailed description of valve 12, reference is made to FIG. 2 wherein it is seen that valve 12 consists of a cylindrical casing 102 having end caps 104 and 106 into which terminate tubes 32 and 34, respectively. Cap 104 is provided with an inlet convergent-divergent nozzle 108 having a throat section 110 while cap 106 is provided with an identical convergent-divergent nozzle 112 having a throat section 114. Each of nozzles 108 and 112 has a diffuser section and an outlet expansive section as seen in FIG. 2.

Within casing 102 is a slidable double-ended needle valve member 116 provided at each end with a pair of needle elements 118 and 122, respectively. Needle valve member 116 is slidable within a pair of bushings 124 and 126, having openings 128 and 132, respectively, of convenient number, size and shape to permit casing 102 to become filled with air under uniform pressure throughout when in use.

Needle valve member 116 is provided with a rack 134 which is engaged with a pinion 136 connected by way of shaft 38 to servo motor 36. Thus, it is seen that motor 36 is capable of positioning valve member 116 along its axis within casing 102 to alter differentially the cross sectional throat areas of nozzles 108 and 112.

Casing 102 is provided with flange 138 for delivering the outlet air to tube 26 which is the inlet for pump 24. Nozzles 108 and 112 are operated during the complete range of wind velocities to be sampled by apparatus 10 at critical conditions in order to permit effective control over the flow rates of the air through proportioning valve 12. It is one of the interesting characteristics of gaseous fluids that a simple regulated nozzle as in the case of liquids will not regulate the mass rate through the nozzle unless and until the critical condition pressure is reached in the throat of the nozzle carrying the gas. That is, it is only possible to change the mass flow rate of a gas through a nozzle by changing the throat area only as long as the throat is maintained at critical pressure. Thus, in the case of the instant invention, the size of pump 24 is selected for the range of conditions under which the system will operate that at all positions of needle valve 116 and hence for all throat areas of nozzles 108 and 112 the pressure drop across these nozzles will always exceed that required to assure sonic velocities in the throat areas of both nozzles.

In the operation of apparatus 10 just described, as the velocity of the ambient air through thermocouple holder 46 drops off in value from some value, the velocity of the air in holder 46 will tend to be less than in holder 44 due to the operation of pump 24 and proportioning valve 12. This will result in a differential signal being produced and servo control 42 will act to null this differential signal by energizing motor 36 to actuate pinion 136 and rack 134 to move needle valve member 116 toward the right, in the direction of closing off nozzle 108. As nozzle 108 operates at critical conditions during its whole range of operation this will immediately result in a reduction in the mass flow rate of air therethrough. Simultaneously, nozzle 112 will permit a compensating larger flow rate of air through it to fulfill the requirements of pump 24. The operation of proportioning valve 12 thus insures quick, effective, and precise regulation of the air flow in sampler 14 to maintain the proper operation of apparatus as an isokinetic sampler.

It is thus seen that there has been provided unique apparatus for the isokinetic sampling of a gas and the proportional mixing of gases from different sources. While only a preferred embodiment of this invention has been described it is understood that many variations thereof may be made without departing from the spirit of the invention which is therefore to be defined only by the appended claims.

I claim:
1. Apparatus for the isokinetic sampling of gaseous fluid comprising:
 (a) an inlet nozzle immersed in a medium of flowing gaseous fluid to be sampled;
 (b) means for maintaining the position of said inlet nozzle with the opening thereof facing into the direction of flow of said fluid;
 (c) means for receiving said gaseous fluid entering said nozzle to collect the particulate borne by said fluid;
 (d) proportioning means for receiving said gaseous fluid from the aforesaid collection means and a gaseous fluid from a source other than said collection means and combining said gaseous fluids into a discharge;
 (e) means operating at a constant rate of flow for receiving the discharge of said proportioning means and pumping same to some higher pressure; and
 (f) means to control the operation of said proportioning means to maintain the velocity of gaseous fluid entering said inlet nozzle at a magnitude equal to that of said gaseous fluid in said medium adjacent to said nozzle;
 (g) said proportioning means consisting of first and second nozzles having adjustable throat areas and means effected by said control means for regulating the throat areas of said nozzles to permit selective control over fluid flow rates through said first and second nozzles, the total flow through said proportioning means being substantially constant over the range of operation of said apparatus;
 (h) said pump means operating at a rate of flow insuring sonic fluid velocities in the throat areas of said nozzles.

2. Apparatus for the isokinetic sampling of gaseous fluids comprising:
 (a) air inlet nozzle immersed in a medium of flowing gaseous fluid to be sampled;
 (b) means for maintaining the position of said inlet nozzle with the opening thereof facing into the direction of flow of said fluid to receive a representative sample of said fluid;
 (c) means for filtering particulate from said fluid entering said nozzle;
 (d) means for pumping by suction said fluid entering said nozzle through said filtering means, said pumping means operating at a constant volumetric rate of flow;
 (e) proportioning means for receiving said representative sample of fluid from said filtering means and gaseous fluid from a separate source, mixing the aforesaid gaseous fluids and delivering the mixture of said fluids to said pumping means; and
 (f) means for controlling said proportioning means to adjust the flow of said representative sample so as to maintain an inlet velocity in said nozzle at a value equal to that of the flow of said gaseous medium immediately adjacent said nozzle;
 (g) said proportioning means simultaneously adjusting the flow of fluid from said separate source to maintain the total volumetric flow of fluids to said pumping means at a substantially constant value;
 (h) said proportioning means comprising a pair of nozzles having adjustable throat areas to permit regulation of fluid flows therethrough, and said pumping means maintaining sonic velocities in said throat areas during the complete range of operation of said apparatus.

3. The apparatus of claim 2 in which said controlling means includes a valve member extending into each of said throat areas of the nozzles in said proportioning means, said valve member being slidable to adjust said throat areas simultaneously.

4. Proportioning apparatus for delivering a constant volume rate of flow of gaseous fluids from a pair of separate sources while permitting adjustment of the flow from each of said sources, comprising:
 (a) containment means defining a pair of first and second nozzles discharging into a mixing chamber, each nozzle having a throat section;
 (b) means for adjusting differentially the area of each throat section of said nozzles; and
 (c) means for pumping from said mixing chamber a mixture of said fluids at a constant rate of volumetric flow and maintaining a pressure drop across said nozzles to maintain sonic flow velocity in the throat area of each said nozzle.

5. The proportioning apparatus of claim 4 in which said adjusting means includes an extended valve member terminating at each end into the throat section of each nozzle, and means are provided to slide said valve toward and away from said nozzles to effect the aforesaid variable nozzle throat area control.

References Cited by the Examiner
UNITED STATES PATENTS

| 2,065,128 | 12/1936 | Eisinger | 137—607 X |
| 2,597,177 | 5/1952 | Plass | 137—609 X |
| 2,982,131 | 5/1961 | Rosinski | 73—170 |

LOUIS R. PRINCE, *Primary Examiner.*

S. CLEMENT SWISHER, *Assistant Examiner.*